United States Patent [19]

Brent

[11] 4,239,244
[45] Dec. 16, 1980

[54] HYDRAULIC PISTON ROD SEAL
[75] Inventor: Robert G. Brent, Arlington, Tex.
[73] Assignee: Textron, Inc., Providence, R.I.
[21] Appl. No.: 910,008
[22] Filed: May 26, 1978
[51] Int. Cl.³ .................................................. F16J 9/16
[52] U.S. Cl. ................................ 277/188 R; 277/165
[58] Field of Search ............... 277/165, 188 R, 188 A, 277/143, 154

[56] References Cited

U.S. PATENT DOCUMENTS

| | | | |
|---|---|---|---|
| 1,560,818 | 11/1925 | Houldsworth | 217/143 |
| 2,513,533 | 7/1950 | Thornhill . | |
| 3,071,386 | 1/1963 | Scannell | 277/188 A |
| 3,300,225 | 1/1967 | Shepler . | |
| 3,394,939 | 7/1968 | Mastro | 277/188 R |
| 3,394,941 | 7/1968 | Traub | 277/188 R |
| 3,645,543 | 2/1972 | Ksieski . | |
| 3,817,517 | 6/1974 | Lundquist . | |
| 3,945,650 | 3/1976 | Voitik | 277/165 |
| 3,971,298 | 7/1976 | Kulig . | |
| 3,999,767 | 12/1976 | Sieuenpiper . | |

*Primary Examiner*—Robert I. Smith
*Attorney, Agent, or Firm*—Richards, Harris & Medlock

[57] ABSTRACT

A three-part seal to be fixed in a gland formed on the first of two mating cylindrical structures in a hydraulic apparatus. A continuous Teflon nondeformable bearing ring is provided in the gland. The bearing ring has a first cylindrical surface for contact with the second cylindrical structure, a second cylindrical surface opposite the first surface and a conical rearward facing end surface. A continuous Teflon nondeformable backup seal ring is provided in the gland for mating with the rearward facing conical end surface of the bearing ring against its forward facing conical end surface. A continuous compressible resilient ring is provided on the side of the bearing ring opposite the second cylindrical structure for contacting the bearing ring and the backup seal ring.

21 Claims, 3 Drawing Figures

HYDRAULIC PISTON ROD SEAL

BACKGROUND OF THE INVENTION

1. Field of the Invention

The invention relates to seal ring systems for a hydraulic apparatus, and more particularly, to composite seal ring systems.

2. Discussion of the Prior Art

Conventional O-rings in chevron type packings of the type employed in a hydraulic apparatus have recently been replaced by multiple-element sealing arrangements having both deformable and nondeformable components. These multiple component systems work especially well in high pressure applications. In such systems, a gland typically contains a three-part seal in which a wear-resistant plastic ring makes contact with a moving shaft. A deformable resilient ring may be disposed between the contact ring and the gland walls so that pressure applied to the deformable ring results in contact of the wear-resistant rings against the moving surface. U.S. Pat. Nos. 2,513,533, 3,817,517 and 3,394,941 disclose seal assemblies in which elastomeric rings bear against wear-resistant plastic rings which make contact with reciprocating cylindrical structures. These assemblies, however, all use a single contact ring. Applicant's improvement provides an elastomeric ring and two contact rings, a bearing ring and a backup seal ring. Pressure applied to the bearing ring enhances contact by the backup seal ring to provide a high pressure dynamic seal.

SUMMARY OF THE INVENTION

The present invention is directed to providing an improved dynamic seal between reciprocating cylindrical structures in a hydraulic apparatus.

In accordance with the present invention, the three-part seal is adapted to be fixed in a gland formed on the first of two mating cylindrical structures. A continuous nondeformable bearing ring having a first cylindrical surface for contact with the second cylindrical structure and a second cylindrical surface of greater length than the first cylindrical surface facing away from the second cylindrical structure and having a conical rearward facing end surface is disposed in the gland. A continuous nondeformable backup seal ring having a forward facing conical end surface mates with a rearward facing conical end surface of the bearing ring. A continuous compressible resilient ring is disposed in the gland on the side of the bearing ring opposite the second cylindrical structure to contacting the bearing ring and the backup seal ring.

BRIEF DESCRIPTION OF THE DRAWINGS

For a more complete understanding of the present invention and for further objects and advantages thereof, reference is now made to the following description taken in conjunction with the accompanying drawings in which.

DESCRIPTION OF THE PREFERRED EMBODIMENT

Figure 1:
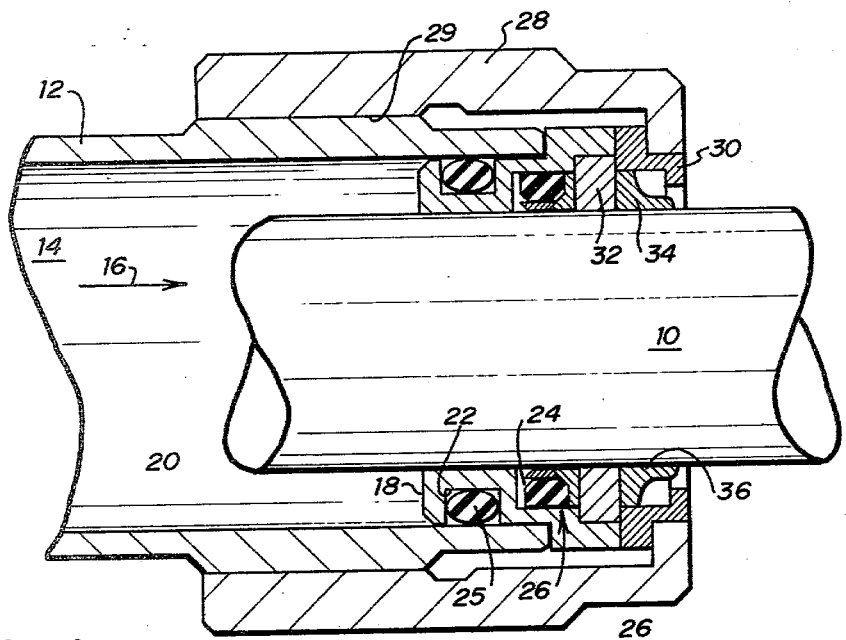
FIG. 1 is a section view of a hydraulic assembly in which the preferred embodiment is employed in female form.

Referring to FIG. 1, a hydraulic piston rod 10 is shown disposed in a hydraulic cylinder or barrel 12 containing hydraulic fluid 14 under high pressure. The outside of the barrel is at atmospheric pressure. The direction of hydraulic pressure in the barrel is indicated by the arrow 16. Piston rod 10 is retained in barrel 12, free to reciprocate in an axial direction. Structure is provided to dynamically seal the rod in the barrel to retain the high hydraulic pressure. In the first embodiment in which the dynamic seal is employed on female structure, static and dynamic sealing is provided by an annular retaining plug 18 disposed concentrically between the concave cylindrical inside surface 20 of the barrel 12 and the convex outer surface of piston rod 10. Retaining plug 18 contains an annular groove 22 opening oppositely piston rod 10 towards inside surface 20 and a gland 24 opening towards piston rod 10. Groove 22 is designed to house a conventional O-ring 25 to effect a static seal between retaining plug 18 and the barrel's inner surface 20. Gland 24 receives a sealing assembly 26 which effects a dynamic seal between retaining plug 18 and piston rod 10.

The annular retaining plug 18, disposed concentrically between the barrel's inner surface 20 and piston rod 10, extends outside the barrel and abuts against the outer end thereof as shown in FIG. 1. Retaining plug 18 is firmly secured by a barrel cap 28 which threadedly engages the barrel's outer surface 29. An excluder retainer 30 is disposed between retaining plug 18 and barrel cap 28. A separator ring 32 and an excluder ring 34 are disposed rearward of gland 24 between retaining plug 18 and piston rod 10 and to provide a static seal between retaining plug 18 barrel 12 and the barrel cap 28.

Figure 2:
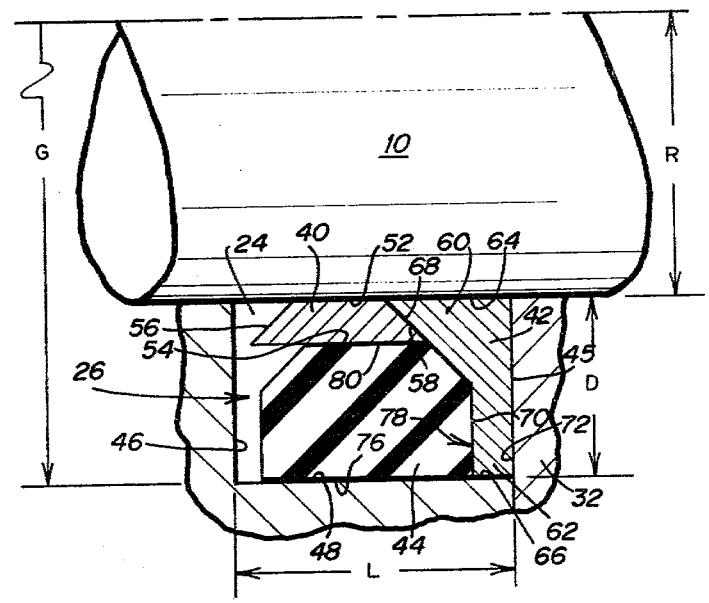
FIG. 2 is a detailed section view of the gland shown in FIG. 1.

As best shown in FIG. 2, seal assembly 26 contains a bearing ring 40, a backup seal ring 42 and a compression ring 44. The end surface 45 of cylindrically shaped separator ring 32 forms the rearward boundary of gland 24 and enhances the seal between piston rod 10 and retaining plug 18. Excluder ring 34 disposed between the separator ring 32 and retaining member 30 has a cylindrical inner face 36 which mates with piston rod 10 (FIG. 1).

The seal assembly 26 is shown in greater detail in FIG. 2. Gland 24 is defined by a front wall 46, a bottom wall 48 and bounded by the forward end surface 45 of separator ring 32. The two contact rings, bearing ring 40 and backup seal ring 42, are manufactured of plastic, such as Teflon, which is highly wear-resistant, nondeformable and has a low coefficient of friction. A continuous (nonsplit) compression ring 44 is employed between the gland walls and the contact rings to contact the bearing ring and the backup seal ring. Compression ring 44 is manufactured of rubber or other suitable resilient material and is disposed in gland 24 adjacent rings 40 and 42 between front wall 46 and bottom wall 48 of the gland. Compression ring 44 is thus separated from movable piston rod 10 so as not to be subject to wear from direct contact by the rod.

Bearing ring 40 is a relatively thin ring having a cylindrical inner face 52 which makes contact with piston rod 10, a concentric cylindrical outer face 54, and forward and rearward conical end surfaces 56 and 58. Conical end surfaces 56 and 58 slope inwardly toward inner face 52, so that outer face 54 is wider than the inner face 52.

As best illustrated in FIG. 2, backup seal ring 42 is foot-shaped in cross section and includes a relatively thin toe portion 60 and an ankle portion 62, of thickness substantially the depth of gland 24. The inner face 64 of ring 42, which bears against piston rod 10, has a conical forward end surface 68 which makes an angle of about 45 degrees with inner face 64. Toe portion 60 thus tapers inwardly toward the planar forward end surface 70 of ankle portion 62. The 45 degree angle of conical forward edge 68 compliments the conical rearward edge 58 of bearing ring 40 so that end surfaces of rings 40 and 42 are maintained in edgewise abutment as hereafter described. The ring's cylindrical outer face 66, which is narrower in width than inner face 64, rests against bottom wall 48 of the gland. The planar rearward end surface 72 of ring 42 interfaces with the forward planar end surface 45 of separator ring 32, which is the rearward boundary of gland 24.

Compression ring 44 is retained in gland 24 with its cylindrical outer face 76 disposed against the bottom wall. The ring's rearward end surface 78 is contoured to mate with end surfaces 68 and 70 so that the ring 44 bears against the backup seal ring under compression. Compression ring 44 has sufficient thickness so that its inner face 80 mates with and bears against the outer face 54 of bearing ring 40.

As hydraulic pressure builds up in the gland, compression ring 44 is compressed and exerts force against the outer face 54 of bearing ring 40 and against the conical end surface 68 of the backup ring. The pressure on the bearing ring forces its end surface 58 against the abutting end surface 68 of the backup ring. The pressure exerted on backup ring 42 by bearing ring 40 and compression ring 44 enhances the contact between the backup ring and the piston rod. The slope and orientation of the end surfaces 58 and 68, of course, makes it possible to direct the force applied to backup ring 42 against the piston rod.

FIGS. 1 and 2 thus illustrate a unique multiple-component seal assembly employed on the female structure of a hydraulic apparatus in which both a bearing ring and backup seal ring are used to effect a dynamic seal between the piston rod and barrel.

Figure 3:
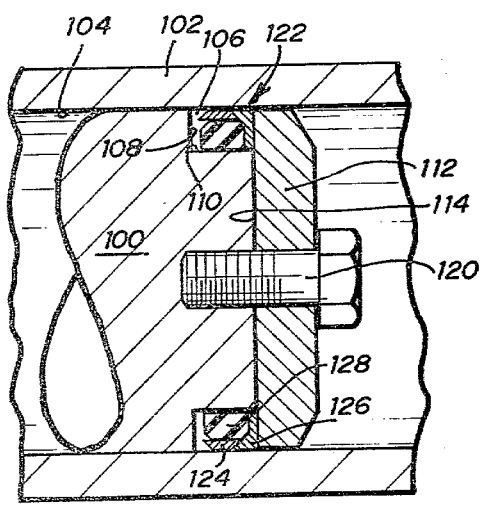
FIG. 3 is a section view of a hydraulic assembly in which the preferred embodiment is employed in male form.

Turning now to FIG. 3, a second embodiment of the invention in which a dynamic seal is provided by a seal assembly in the male structure of a hydraulic apparatus is illustrated.

A piston rod 100 is shown in a barrel 102, free to reciprocate along the axis thereof. Barrel 102 has a cylindrical inner surface 104. In the second embodiment shown in FIG. 3, the gland 106 is formed in the piston rod 100, rather than in a peripheral retaining plug as in the embodiment shown in FIGS. 1 and 2. An annular gland 106 is notched in the cylindrical surface of piston rod 100 to define a forward gland wall 108 and an annular bottom gland wall 110. A rearward gland wall is provided by the end surface of a retainer 112 secured to the posterior end surface 114 of the rod by a bolt 120.

A bearing ring 124, a backup seal ring 126 and a compression ring 128 are configured to fit in gland 106 and have the identical structural and functional relationship as bearing ring 40, backup seal ring 42 and compression ring 44 described in connection with FIGS. 1 and 2 above. This seal assembly 122 creates a dynamic seal between piston rod 100 and inner surface 104 of barrel 102.

Utilizing the seal assembly in male form obviates the need for a retaining plug and rings to effect a static seal between the retaining plug and barrel.

It will thus be seen that the present invention provides a unique dynamic seal assembly for concentric reciprocating cylindrical surfaces capable of use in a high pressure hydraulic apparatus. The invention would especially be useful in applications such as hydraulic actuaters on aircraft.

Although particular embodiments of the invention have been illustrated in the drawings and described herein, it will be understood that the invention is not limited to the embodiments disclosed, but is capable of rearrangement, modification and substitution of parts and elements without departing from the spirit of the invention.

What is claimed is:

1. In a hydraulic cylinder, a three-part seal to be fixed in a gland formed on the first of two mating cylindrical structures, said gland having a bottom wall confronting the second cylindrical structure, wherein fluid under pressure is to be contained forward of said gland comprising:
   (a) a continuous nondeformable bearing ring in said gland having a cylindrical surface for contact with the surface of the second of said cylindrical structures and having an annular surface facing away from said second of said cylindrical structures and having a conical rearward facing end surface diverging outwardly from said first cylindrical surface;
   (b) a continuous nondeformable backup seal ring having a forward facing conical end surface mating with the rearward facing conical end surface of said bearing ring; and
   (c) a continuous compressible resilient ring in said gland on the side of said bearing ring opposite said second cylindrical structure contacting the bearing ring, the seal ring and gland bottom wall whereby pressure on said resilient ring transmits pressure to said bearing ring and backup seal ring to engage said rings against the second cylindrical structure.

2. The combination set forth in claim 1 in which the angles of said conical end surfaces are complimentary.

3. The combination set forth in claim 1 wherein said bearing ring and said seal ring are of Teflon.

4. The combination set forth in claim 1 wherein said compressible ring is of rubber.

5. The combination set forth in claim 1 wherein the first of said cylindrical structures is an annular retaining plug adapted to be mounted in the hydraulic cylinder.

6. The combination set forth in claim 1 wherein the second of said cylindrical structures is the hydraulic cylinder.

7. The combination set forth in claim 6 wherein the first of said cylindrical structure is a piston rod reciprocally mating with said cylinder.

8. The combination set forth in claim 1 wherein said backup seal ring substantially extends from the surface of the second of said cylindrical structures to said gland bottom wall.

9. The combination set forth in claim 1 wherein said annular surface of said continuous nondeformable bearing ring is a cylindrical surface substantially parallel to the cylindrical surface of said second cylindrical structure.

10. The combination set forth in claim 1 wherein said resilient ring is configured to mate with said backup seal ring and at least a portion of said bearing ring to completely fill the rearward end of said gland regardless of said fluid pressure.

11. In a hydraulic system, a hydraulic seal for sealing between a piston rod member and a surrounding cylinder member, one of said members having an annular gland therein with a cylindrical gland surface formed therein and spaced from a cylindrical mating surface on said other member, comprising:
(a) a continuous nondeformable bearing ring disposed in the gland having a first cylindrical bearing ring surface for contact with said cylindrical mating surface on said other member and having a second cylindrical surface spaced axially from said first cylindrical bearing ring surface facing the cylindrical gland surface, said bearing ring also having a conical end surface extending from said first cylindrical bearing ring surface;
(b) a continuous nondeformable backup seal ring disposed in the gland having a cylindrical surface for contact with the cylindrical mating surface on said other member and having a conical end surface mating with the conical end surface of said bearing ring, said backup seal ring substantially extending from the cylindrical gland surface to the cylindrical mating surface on said other member; and
(c) a continuous compressible rubber ring in the gland on the side of said bearing ring opposite the cylindrical mating surface on said other member, said ring contacting said bearing ring, said seal ring and the cylindrical gland surface at the annular gland.

12. The hydraulic seal according to claim 11 wherein the conical end surface of said nondeformable bearing ring diverges outwardly from the first cylindrical bearing ring surface.

13. The combination set forth in claim 11 wherein such rubber ring is configured to mate with said backup seal ring and said bearing ring to completely fill the end of said gland adjacent said backup seal regardless of fluid pressure in said cylinder.

14. In a hydraulic apparatus having a barrel and a piston rod reciprocally movable therein, apparatus for providing a hydraulic seal between the piston and the barrel, comprising:
(a) an annular retaining plug, the outer periphery of said plug dimensioned to fit concentrically within the barrel, the inner periphery of said plug dimensioned to mate with the piston rod reciprocally movable therein, said plug having first and second glands formed therein, said first gland opening outwardly toward the barrel and said second gland opening inwardly toward the piston rod;
(b) an O-ring disposed in said first gland for providing a static seal between the barrel and said plug;
(c) a relatively thin nondeformable bearing ring disposed in said second gland, said ring having a first cylindrical surface for contact with the rod and a second cylindrical surface facing away from the rod and having a conical rearward facing end surface;
(d) a continuous nondeformable backup seal ring disposed in said second gland and having a third cylindrical surface for contact with the rod and having a forward facing conical end surface mating with the rearward facing conical end surface of said bearing ring; and
(e) a continuous compressive resilient ring in said gland on the side of said bearing ring opposite said second cylindrical structure contacting the bearing ring and the seal ring.

15. The combination recited in claim 14 wherein said resilient ring is configured to mate with said bearing ring and said backup seal ring to completely fill the end of said second gland adjacent said backup seal regardless of fluid pressure in said barrel.

16. The combination set forth in claim 14 in which the angles of said conical surfaces are about 45°.

17. The apparatus of claim 14 further comprising:
(f) an annular barrel cap threadedly mounted to the exterior surface of said barrel for securing said retaining plug therein.

18. The apparatus of claim 17 further comprising:
(g) a separator ring disposed rearwardly of said seal ring and between said plug and said rod for retaining said seal ring and said second gland;
(h) a retaining member disposed rearwardly of said plug between said barrel cap and said retainer plug; and
(i) an excluder ring disposed between said retaining member and said rod, said excluder ring having an end surface abutting with said separator ring and having a cylindrical surface for mating with said rod.

19. In a hydraulic apparatus having a cylindrical barrel and a piston rod reciprocally movable therein, the piston rod having an annular gland formed on the surface thereof, said gland having a bottom wall confronting the barrel, an apparatus for providing a hydraulic seal between the piston rod and the barrel comprising:
a relatively thin nondeformable continuous bearing ring disposed in said gland in contact with the inside surface of said barrel, said bearing ring having a first cylindrical surface for contact with the inside surface of said barrel and having a second surface facing away from said barrel and having a conical rearward facing end surface diverging outwardly from the surface of said barrel;
continuous backup seal ring in contact with the inside surface of the barrel and having a forward facing conical end surface mating with a rearward facing conical end surface of said bearing ring; and
continuous compressible resilient ring in said gland on the side of said bearing ring opposite the barrel contacting the bearing ring, the seal ring and the gland bottom wall whereby pressure on said resilient ring transmits pressure to said bearing ring and backup seal ring to engage said rings against said barrel.

20. The combination set forth in claim 19 in which the angles of said conical end surfaces are about 45°.

21. The combination recited in claim 19 wherein said resilient ring is configured to mate with said bearing ring and said backup seal ring to completely fill the end of said gland adjacent said backup seal regardless of fluid pressure in said barrel.

* * * * *